United States Patent
Waldroup

[19]

[11] Patent Number: 5,967,607
[45] Date of Patent: *Oct. 19, 1999

[54] SHOPPING CART CUSHION

[76] Inventor: Thelma J. Waldroup, 6720 Flagler Dr., Pensacola, Fla. 32503

[ * ] Notice: This patent issued on a continued prosecution application filed under 37 CFR 1.53(d), and is subject to the twenty year patent term provisions of 35 U.S.C. 154(a)(2).

[21] Appl. No.: 08/933,072

[22] Filed: Sep. 18, 1997

[51] Int. Cl.$^6$ .................................................. A47C 4/30
[52] U.S. Cl. ................ 297/256.17; 297/467; 297/219.12
[58] Field of Search ....................... 297/256.17, 219.12, 297/485, 228, 467, 229

[56] References Cited

U.S. PATENT DOCUMENTS

| | | | |
|---|---|---|---|
| D. 308,614 | 6/1990 | Gordon . | |
| D. 367,197 | 2/1996 | Fuchs . | |
| 1,048,033 | 12/1912 | Brown .................................. | 297/485 X |
| 1,836,302 | 12/1931 | Bloomfield ............................ | 297/229 |
| 2,362,465 | 11/1944 | Carner .................................. | 297/485 X |
| 3,578,380 | 5/1971 | Jacobus ................................. | 297/229 |
| 4,204,695 | 5/1980 | Salzman . | |
| 4,416,462 | 11/1983 | Thompson . | |
| 4,568,125 | 2/1986 | Sckolnik . | |
| 4,655,502 | 4/1987 | Houllis . | |
| 4,666,207 | 5/1987 | Quartano . | |
| 4,805,937 | 2/1989 | Boucher et al. ............... | 297/219.12 X |
| 4,861,109 | 8/1989 | Leach .................................. | 297/485 X |
| 5,106,155 | 4/1992 | Luehring . | |
| 5,238,293 | 8/1993 | Gibson . | |
| 5,354,121 | 10/1994 | Allum . | |
| 5,499,860 | 3/1996 | Smith et al. ........................ | 297/485 X |
| 5,547,250 | 8/1996 | Childers . | |
| 5,678,888 | 10/1997 | Sowell et al. .................. | 297/219.12 X |
| 5,800,020 | 9/1998 | Brock ............................. | 297/256.17 X |
| 5,833,309 | 11/1998 | Schmitz ........................ | 297/219.12 X |

*Primary Examiner*—Peter M. Cuomo
*Assistant Examiner*—David E. Allred
*Attorney, Agent, or Firm*—Peter Loffler

[57] ABSTRACT

A shopping cart cushion for placement into the mini basket portion of a shopping cart is comprised of a body, left extension and right extension. A strap is attached to the left extension and passes through a loop on the right extension for securement of a child sitting within the device. An optional bar protector is either fixedly or removably attached to the body and is wrapped around the handle bar of the shopping cart. The device folds up and is easy to transport.

11 Claims, 5 Drawing Sheets

SHOPPING CART CUSHION

BACKGROUND OF THE INVENTION

1. Field of the Invention

The present invention relates to a cushion and more specifically to a shopping cart cushion for use by a child within the rear mini-basket of a shopping cart.

2. Background of the Prior Art

Providing a seat cushion for use by a child within the rear mini-basket portion of a typical shopping cart is well-known. The prior art discloses many such seating devices. U.S. Pat. No. 4,204,695 to Salzman, U.S. Pat. No. 4,416,462 to Thompson, U.S. Pat. No. 4,568,125 to Sckolnik, U.S. Pat. No. 4,655,502 to Houllis, U.S. Pat. No. 4,666,207 to Quartano, U.S. Pat. No. 5,106,155 to Luehring, U.S. Pat. No. 5,238,293 to Gibson, U.S. Pat. No. 5,354,121 to Allum, U.S. Pat. No. 5,547,250 to Childers, U.S. Pat. No. Des 308,614 to Gordon, and U.S. Pat. No. Des 367,197 to Fuchs are exemplary of shopping cart seats for use by children. These prior art devices, while providing varying levels of comfort and effectiveness in their intended purpose, suffer from at least one of several drawbacks.

These drawbacks include seats that lack a high degree of comfort to the child. By providing little or no cushioning to parts of the child's body that make contact with the cart, these seating devices are undesirable. Many devices have limited use in that they will properly fit into a limited number of shopping cart types. Other devices are bulky and thus impractical to transport by the average user. Still other devices are unduly complex making them cost-prohibitive to manufacture.

Therefore, there is a need in the art for a shopping cart cushion that overcomes the problems associated with prior art devices. Such a cushion must be relatively soft and resilient providing cushioning to all parts of the child that contact the cart. Such a cushion must be useable with a broad range of shopping cart types. Finally, such a cushion must be relatively simple in design and construction and should be relatively compact and easy to transport.

SUMMARY OF THE INVENTION

The shopping cart cushion of the present invention addresses the aforementioned needs in the art. The shopping cart cushion is a relatively soft member that provides cushioning at all points of contact between child and cart. The cushion can be used with most types of shopping carts currently in use. The present invention is of relatively simple design and construction and, when not in use, folds into a tidy compact form that is easy to transport and store.

The shopping cart cushion of the present invention is comprised of a main body that supports the back and bottom area of a child seated within the cart. A pair of wing extensions are foldably connected to the body. A retention strap is attached to one of the extensions for securement around the child while in a seated position. An optional bar protector is either removably or fixedly attached to the main body in order to wrap around the rear handle bar of the shopping cart.

Therefore, it is an object of the present invention to provide a shopping cart cushion that provides cushioning to all points of contact between the child and the cart.

It is another object of the present invention to provide a shopping cart cushion that can be used with most types of shopping carts.

It is another object of the present invention to provide a shopping cart cushion that is relatively simple in design and construction.

It is another object of the present invention to provide a shopping cart cushion that is relatively compact in storage and transport.

Other features and advantages of the invention will become apparent to those skilled in the art upon review of the following detailed description, drawings, and claims.

BRIEF DESCRIPTION OF THE DRAWINGS

Similar reference numerals refer to similar parts throughout the several views of the drawings.

DESCRIPTION OF THE PREFERRED EMBODIMENT

Figure 1:
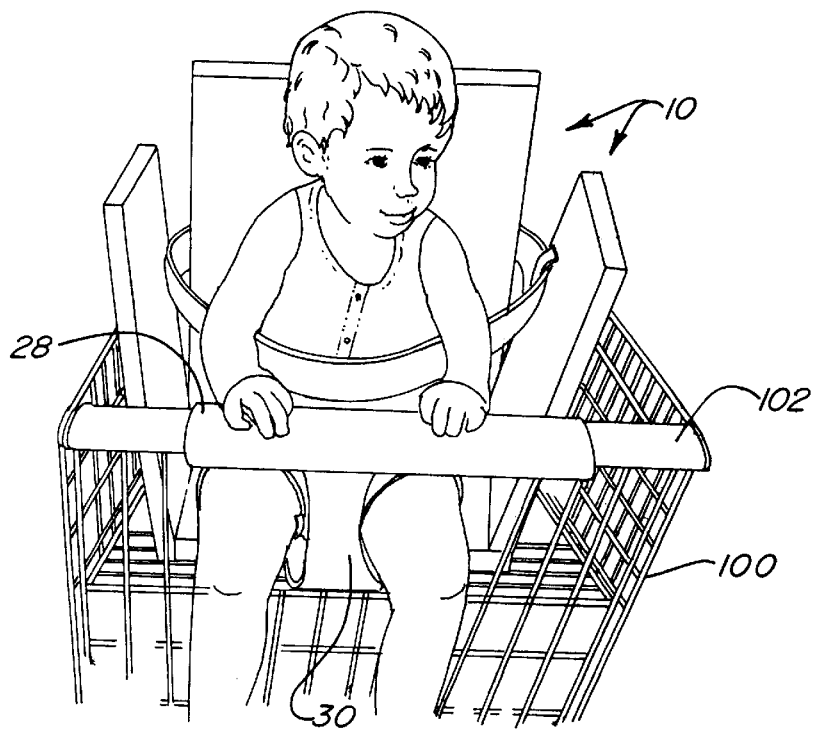
FIG. 1 is a perspective view of the shopping cart cushion of the present invention in use within a shopping cart.
Figure 2:
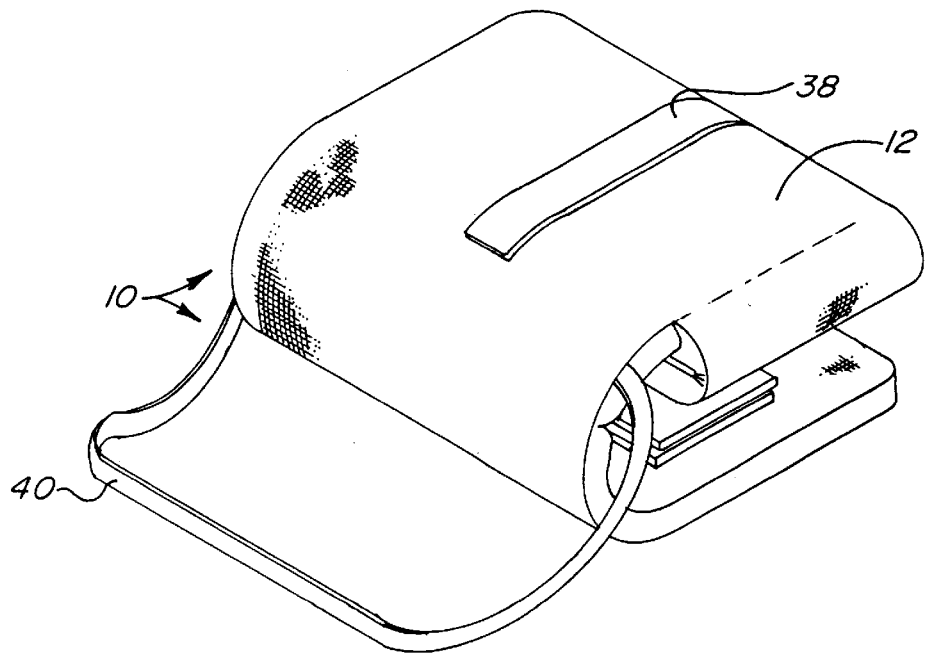
FIG. 2 is a perspective view of the shopping cart cushion folded for transport.

Referring now to the drawings, it is seen that the shopping cart cushion, generally denoted by reference numeral 10, is comprised of a body 12 having a left wing extension 14 foldably connected to the body 12 at fold line 16 and a right wing extension 18 foldably connected to the body at fold line 20. The body 12, left extension 14, and right extension 18, are all formed from a soft resilient material such as closed-cell foam or the like and can be covered with an appropriate covering. Alternately, the body 12, left extension 14, and right extension 18, can be made from an appropriate outer shell material that is appropriate for an outer shell of a typical pillow and have an inner cavity that is filled with a stuffing material suitable for a pillow or cushion such as down, cotton, feathers, polyester, etc.

Attached to either side of the body 12 is a carrying handle 40. Attached to the left extension 14 is a strap 22 while a loop 24 is attached to the right extension 18. The strap 22 may, but need not be, constructed from a soft resilient material similar to the construction of the body 12, left extension 14, and right extension 18. Located on either end of the strap 22 is an attachment device such as the illustrated cooperating hook and loop material 26. It is recognized that other attachment devices such as snaps or buckles can be located on the ends of the strap 22.

Figure 3:
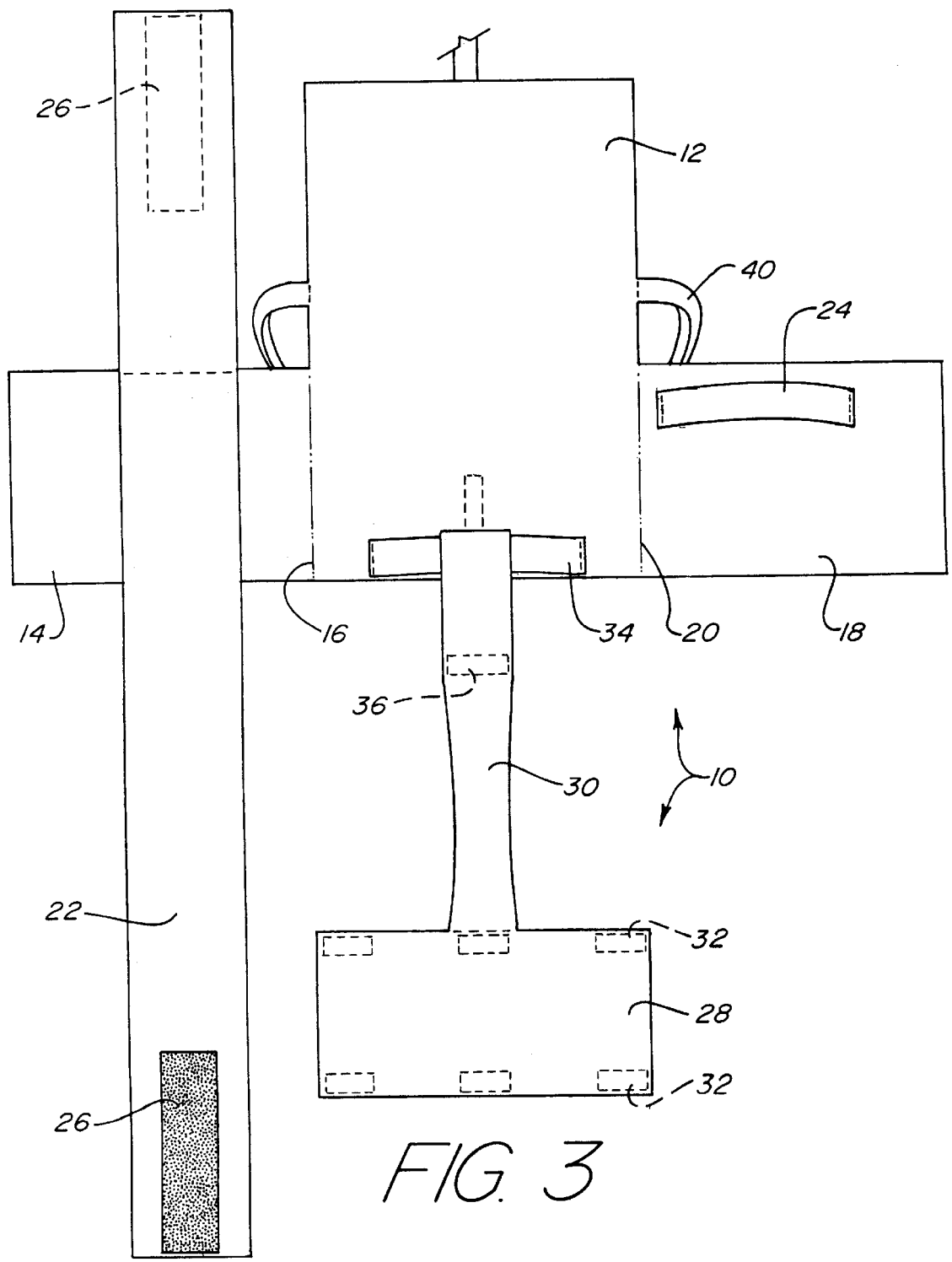
FIG. 3 is a front view of the shopping cart cushion laid flat.
Figure 4:
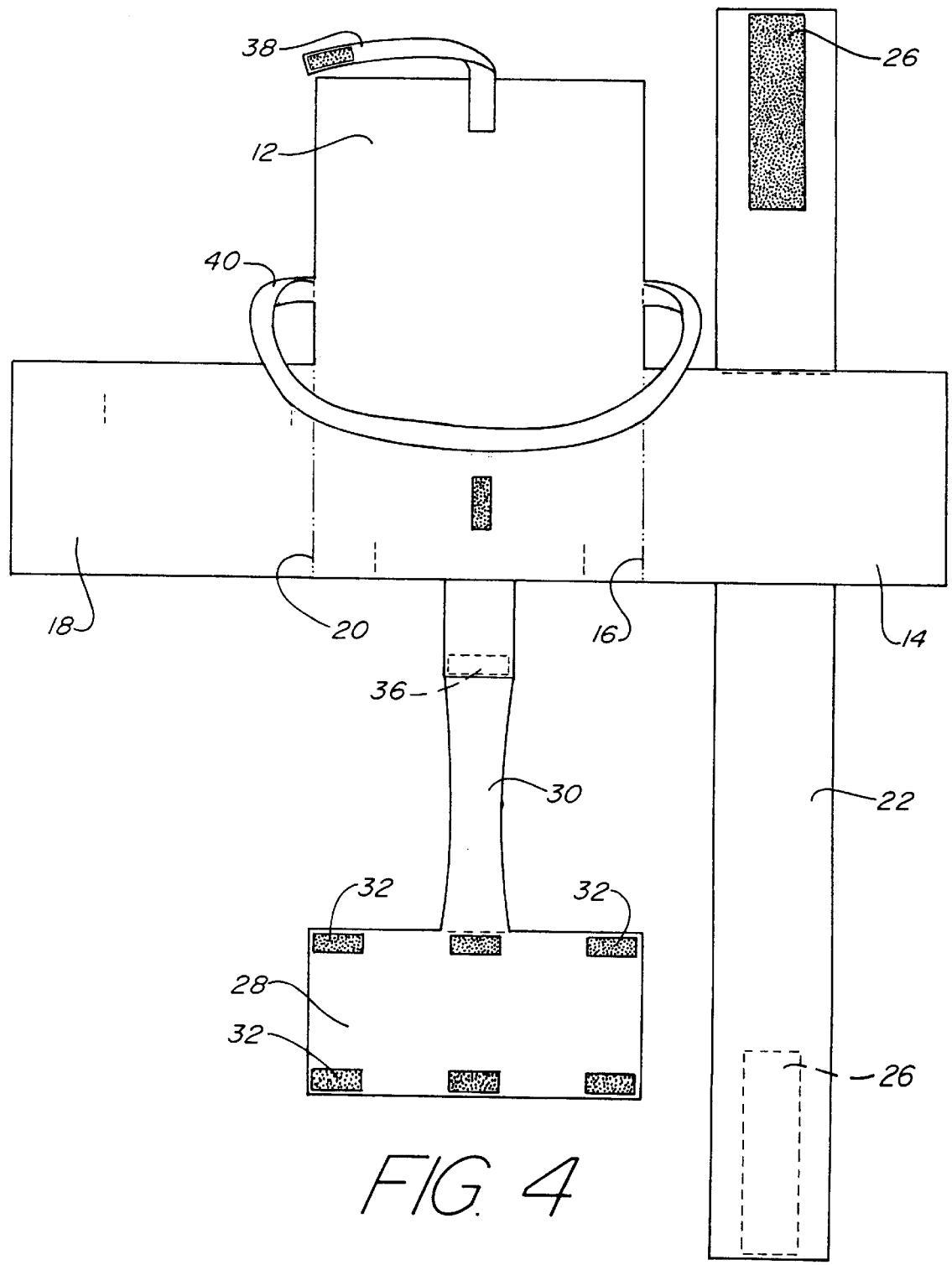
FIG. 4 is a rear view of the shopping cart cushion laid flat.
Figure 5:
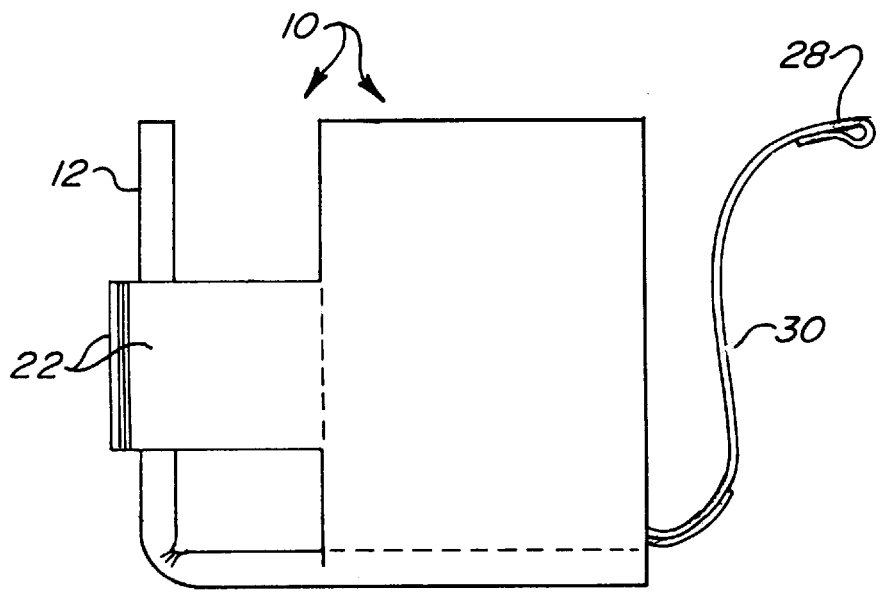
FIG. 5 is a right side view of the shopping cart cushion.
Figure 6:
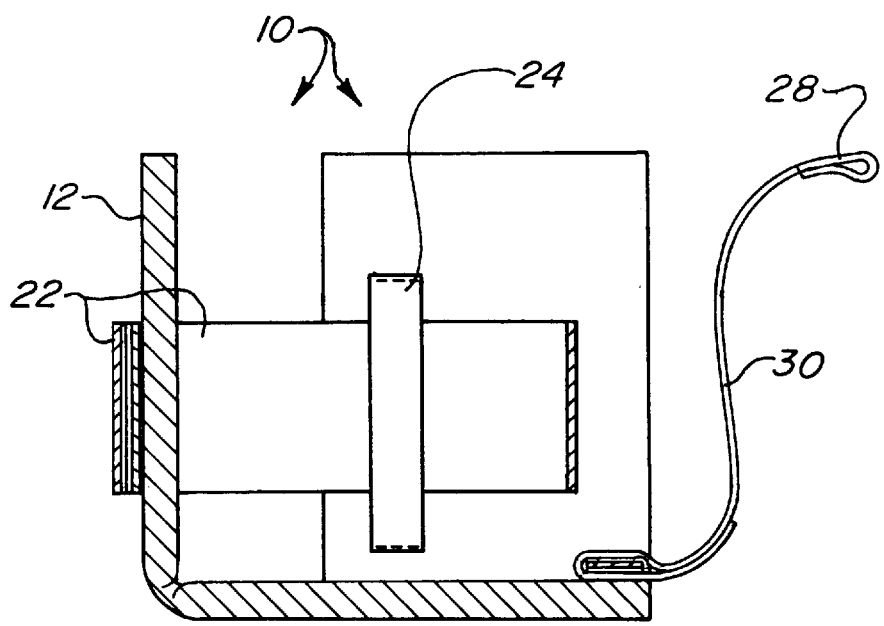
FIG. 6 is a sectioned right side view of the shopping cart cushion illustrating the strap attachments.
Figure 7:
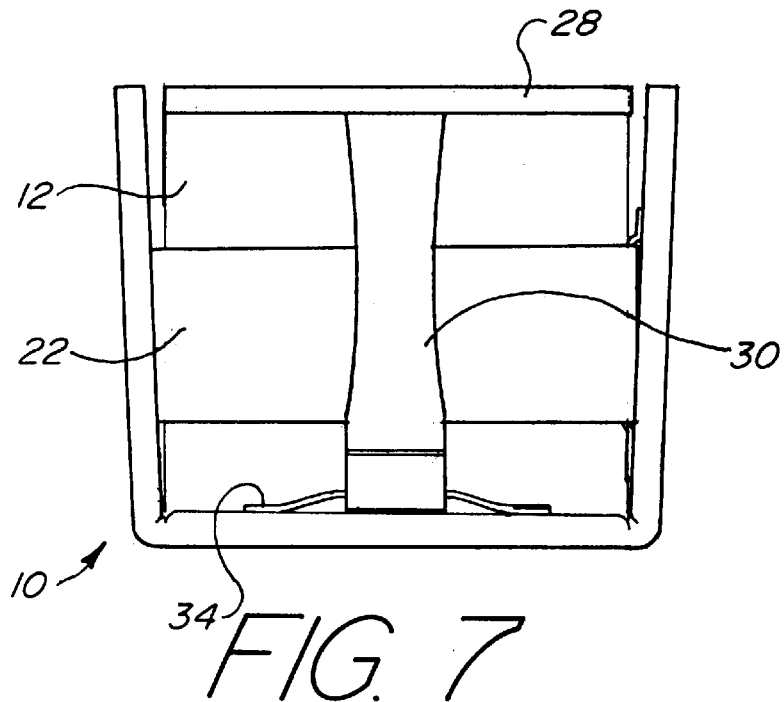
FIG. 7 is a front elevation view of the shopping cart cushion.
Figure 8:
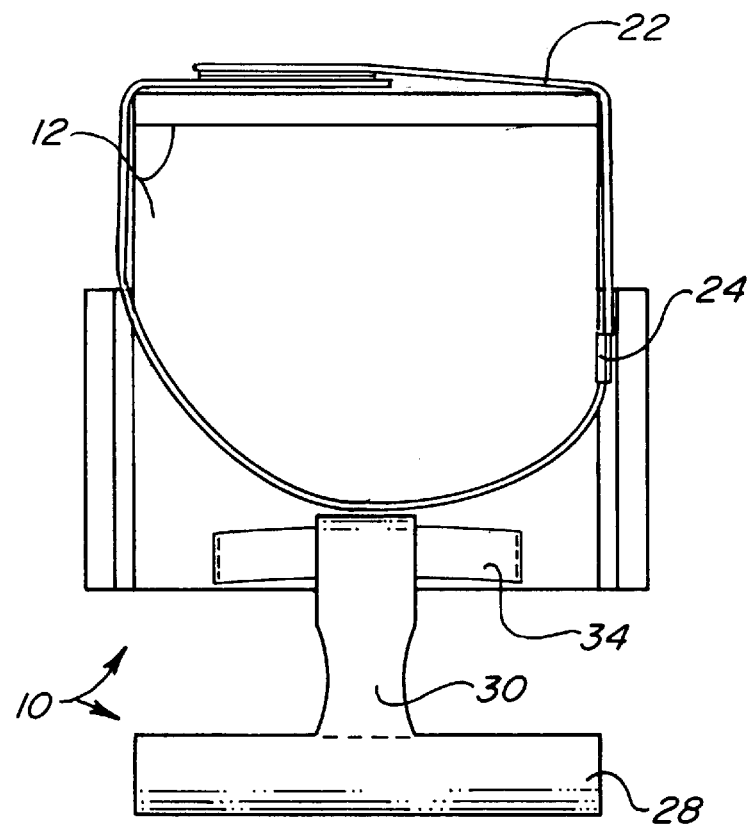
FIG. 8 is a top plan view of the shopping cart cushion.

Optionally attached to the bottom of the body 12 is a bar protector which is comprised of a bar pad 28 and a connection strap 30. The bar pad 28 and the connection strap 30 may be but need not be, constructed from soft resilient manner similar to the construction of the body 12, left extension 14, and right extension 18. Located on the bar pad 28 is an attachment device such as the illustrated cooperating hook and loop material 32. It is recognized that other attachment device such as snaps or buckles can be located on the bar pad 28. The connection strap 30 may be either fixedly or removably attached to either the top side or the bottom side of the body 12. By way of example, FIGS. 3 and 6–8 illustrate one method of removably attaching the connection strap 30 to the body 12. Specifically, a loop 34 is located on the body 12 and the connection strap 30 passes through the loop 34 and attaches to itself. This self attachment can be accomplished by the illustrated cooperating hook and loop material 36 or by any other attachment means such as snaps or buckles can be located on the ends of the connection strap 30.

Alternately, the connection strap 30 can be attached to the body 12 by placing one portion of cooperating hook and loop material on the connection strap 30 and the other cooperating portion of hook and loop material on the body 12 and mating the two portions. Other attachment means, such as snap, buckle, etc., can be positioned in similar fashion.

In order to utilize the shopping cart cushion 10 of the present invention, the body 12 is placed into the mini-basket portion of the shopping cart 100, such that the body covers the horizontal portion and the back wall portion of the mini-basket. The left extension 14 and the right extension 18 are each unfolded so that they are positioned proximate the left and right side walls respectively of the mini-basket. The child is placed into the mini-basket in the usual way. The strap 22 is wrapped around the front of the child and is passed through the loop 24. The strap 22 is secured to itself in the appropriate fashion proximate the rear of the body 12 (and thus behind the child).

If the optional bar protector is used, it is attached to the body 12 (if removably attached thereto) prior to placement of the child onto the device 10. The bar pad 28 is wrapped around the handle bar 102 of the shopping cart 100 and the bar pad 28 is secured to itself (it is recognized that although the same face of the bar pad 28 is secured to itself, that the bar pad 28 may overlap itself and thus one face will be secured to the other).

Once the shopping trip is completed, the child is removed from the device 10 and the strap 22 is removed from the loop 24. The left extension 14 and right extension 18 are folded into the body 12 and the bar protector is positioned proximate the extensions 14 and 18 (the bar protector may but need not be detached from the body 12). The body 12 is then folded over and a closure strap 38 that is attached to the top of the body 12 is brought around and attached to the bottom of the body 12 in appropriate fashion such as using cooperating hook and loop material, snaps, buckle, etc. The device 10 is now folded and relatively compact and can be easily transported by the handle 40.

While the invention has been particularly shown and described with reference to an embodiment thereof, it will be appreciated by those skilled in the art that various changes in form and detail may be made without departing from the spirit and scope of the invention.

I claim:

1. A cushion comprising:
   a substantially rectangular body having a left side, a right side, an upper portion, and a lower portion;
   a first extension, having a first top surface, and a first bottom surface, foldably attached to the right side of the body at the lower portion, the lower portion separated from the upper portion by a fold region which extends from the left side to the right side;
   a second extension, having a second top surface, and a second bottom surface, foldably attached to the left side of the body at the lower portion;
   a first flexible strap, having a pair of ends, the first strap attached to the first top surface of the first extension and adapted to pass through a loop on the second top surface of the second extension;
   a second strap having a first end removably attached to the body and a second end;
   a bar pad, attached to the second end, the bar pad having a body member with an upper portion and a lower portion, the bar pad adapted to be removably secured to and to encompass a tubular member; and
   wherein in use, the lower portion defines a generally horizontal seat portion, the upper portion defines a generally vertical backrest portion, the sides extend upwardly from the lower portion so that the first and second top surfaces face each other, and the first strap forms a loop generally defining a plane spaced above the seat portion.

2. The cushion as in claim 1 wherein the body, first extension and second extension are constructed from a resilient material.

3. The cushion as in claim 2 further comprising a cover covering the body, the first extension and the second extension.

4. The cushion as in claim 1 wherein the body, first extension and second extension are filled with a stuffing material.

5. The cushion as in claim 1 further comprising an attachment means for attaching the pair of ends together.

6. The cushion as in claim 5 wherein the attachment means comprises cooperating hook and loop material.

7. The cushion as in claim 1 further comprising a handle attached to the body.

8. The cushion as in claim 1 wherein the bar pad is constructed from a resilient material.

9. The cushion as in claim 1 further comprising an attachment means for facilitating attachment of the bar pad to the tubular member.

10. The cushion as in claim 9 wherein the attachment means comprises cooperating hook and loop material.

11. The cushion as in claim 9 wherein the attachment means comprises:
    a first element of cooperating hook and loop material attached to the bar pad proximate the upper portion; and
    a second element of cooperating hook and loop material attached to the bar pad proximate the lower portion and adapted to engage with the first element of cooperating hook and loop material.

* * * * *